United States Patent [19]

Lantto et al.

[11] Patent Number: 5,781,858
[45] Date of Patent: Jul. 14, 1998

[54] METHOD AND ARRANGEMENT FOR HANDLING AND INSPECTING SUPPLEMETARY SERVICES INTENDED FOR A MOBILE TELEPHONE UNIT

[75] Inventors: Jörgen Lantto; Ola Stille, both of Stockholm; Mats Gandils, Älvsjö; Bo Åström, Hägersten; Arne Pehrsson, Huddinge, all of Sweden; Ari Peltonen, Aachen, Germany

[73] Assignee: Telefonaktiebolaget LM Ericsson, Stockholm, Sweden

[21] Appl. No.: 530,161

[22] PCT Filed: Jan. 31, 1995

[86] PCT No.: PCT/SE95/00090

§ 371 Date: Sep. 29, 1995

§ 102(e) Date: Sep. 29, 1995

[87] PCT Pub. No.: WO95/21509

PCT Pub. Date: Aug. 10, 1995

[30] Foreign Application Priority Data

Feb. 1, 1994 [SE] Sweden ................................ 9400313

[51] Int. Cl.$^6$ .................................................. H04Q 7/22
[52] U.S. Cl. .................................. 455/414; 455/433
[58] Field of Search ........................ 379/59, 61, 62; 455/33.1, 410, 414, 411, 422

[56] References Cited

U.S. PATENT DOCUMENTS 4,897,866  1/1990  Majmudar et al. .
5,090,050  2/1992  Heffernan ........................... 379/60
5,179,587  1/1993  Bock et al. .
5,181,238  1/1993  Medamana et al. .

FOREIGN PATENT DOCUMENTS

0 459 337  5/1991  European Pat. Off. .
0 478 231  4/1992  European Pat. Off. .

Primary Examiner—Dwayne Bost
Assistant Examiner—Myra K. Wyche
Attorney, Agent, or Firm—Burns, Doane, Swecker & Mathis, L.L.P.

[57] ABSTRACT

A method pertaining to a telecommunications system for handling supplementary services for a mobile unit. The system includes a public land mobile network to which the mobile unit has subscribed. The mobile telephone network includes a main switch or gateway switching center to which there is connected a home location register. The mobile unit services are stored in this register. The method includes the steps of sending an authority word belonging to the mobile unit and the identification of the mobile unit to the home location register from a telephone unit in the telecommunications system via a telephone connection intended for handling services; checking the authority word by comparing the word with an authority word known to the home location register; accepting the authority word received from the telephone unit; sending a service handling specification from the telephone unit to the home location register; and performing the specified handling of the service.

16 Claims, 7 Drawing Sheets

METHOD AND ARRANGEMENT FOR HANDLING AND INSPECTING SUPPLEMETARY SERVICES INTENDED FOR A MOBILE TELEPHONE UNIT

BACKGROUND

The present invention relates to a method of handling and inspecting supplementary services intended for a mobile telephone unit. The invention also relates to an arrangement for carrying out the method.

It has long been possible to utilize so-called supplementary services, in both public switched land telephone systems and mobile telephony. A supplementary service constitutes an expansion in the flexibility of the telephone unit and examples of such services are "call transfer service" and "block on outgoing calls". The call transfer service requires a user of a telephone unit in a telecommunications system to request the transfer of a call arriving at the telephone unit to another telephone unit, through the medium of the dialling buttons on the unit. With regard to which services are available, or when handling a supplementary services, for instance the aforesaid call transfer service which requires a telephone unit to which calls are to be transferred to be specified, it is necessary with known mobile telephony techniques to use the mobile telephone unit for which the service is intended when making said specification. Supplementary services within mobile telephony and the use of these services are shown in GSM recommendation 02.80–02.88, 03.80–03.90 and 04.80–04.90, it being shown, among other things, how the supplementary service of a mobile unit is handled from the mobile unit. However, it is often desirable to handle the service from any selected telephone unit, whether mobile or fixed. The "call transfer" service can be activated, for instance, when the user is in the proximity of a telephone unit to which call transfers are desired. The service "block on outgoing calls" can be activated if the mobile unit has been stolen, for instance. It is known from U.S. Pat. No. 5,090,050 to send an activating signal from a selected telephone unit to a data base in a mobile telephone network to which a mobile unit belongs, i.e. the so-called home network. The signal informs the home network that the mobile has moved or can be expected to move to a so-called remote network. The problem with using this known technique resides in the difficulty in converting signalling of the kind described in the U.S. patent specification to the more complex signalling required for handling and inspecting supplementary services.

SUMMARY

The object of the present invention is to enable supplementary services intended for a mobile unit to be handled and inspected from any chosen telephone unit. This object is achieved in accordance with the invention by establishing a dialogue between a user of the telephone unit and a data base in which the supplementary services to which the mobile unit has subscribed are stored.

Another object of the present invention is to enable available supplementary services to be inspected from any chosen telephone and to be able to inspect the content of the services and also to inspect the activation status of said services.

Another object of the present invention is to enable a supplementary service to be activated/deactivated from any chosen telephone. Still another object of the invention is to enable the configuration of a supplementary service to be given in detail from any chosen telephone, for instance by giving those parameters that are necessary in order to utilize the service.

The present invention thus relates to a method and to an arrangement relating to a mobile telecommunications network for handling and inspecting a supplementary service intended for a mobile unit from any chosen telephone unit. The network includes a home location register in which the supplementary service of the mobile is stored.

The method includes steps for setting-up a connection with the home location register. In this regard, a user of the telephone unit shows his/her authorization and states the service that is to be handled or inspected. The authorization is checked and the service then handled or inspected.

The arrangement includes a system which includes communication nodes, such as switches for instance. The nodes enable messages to be transported to and from the telephone unit and the home location register. The nodes include transmitter and receiver units for transmitting and receiving the messages necessary to the invention.

The invention thus solves the problem of dealing with supplementary services from a chosen telephone unit. The advantage with this solution is that the owner of a mobile unit is able to deal with supplementary services intended for the mobile unit without having access to the mobile unit when dealing with said services. For instance, the invention can be used advantageously when the owner of a mobile unit has forgotten to instigate a call transfer service after having moved to another telephone unit. The invention may also be used to advantage when the owner's mobile unit has been stolen, for instance. The service "Block on outgoing calls" can then be activated by the owner from another telephone unit.

The invention will now be described in more detail with reference to exemplifying embodiments thereof and also with reference to the accompanying drawings.

DETAILED DESCRIPTION

There will be described in more detail a telecommunications system which includes a public switched land network and a PDC-type mobile telephone network (Personal Digital Cellular) and thereafter a few embodiments relevant to the invention.

Figure 1:
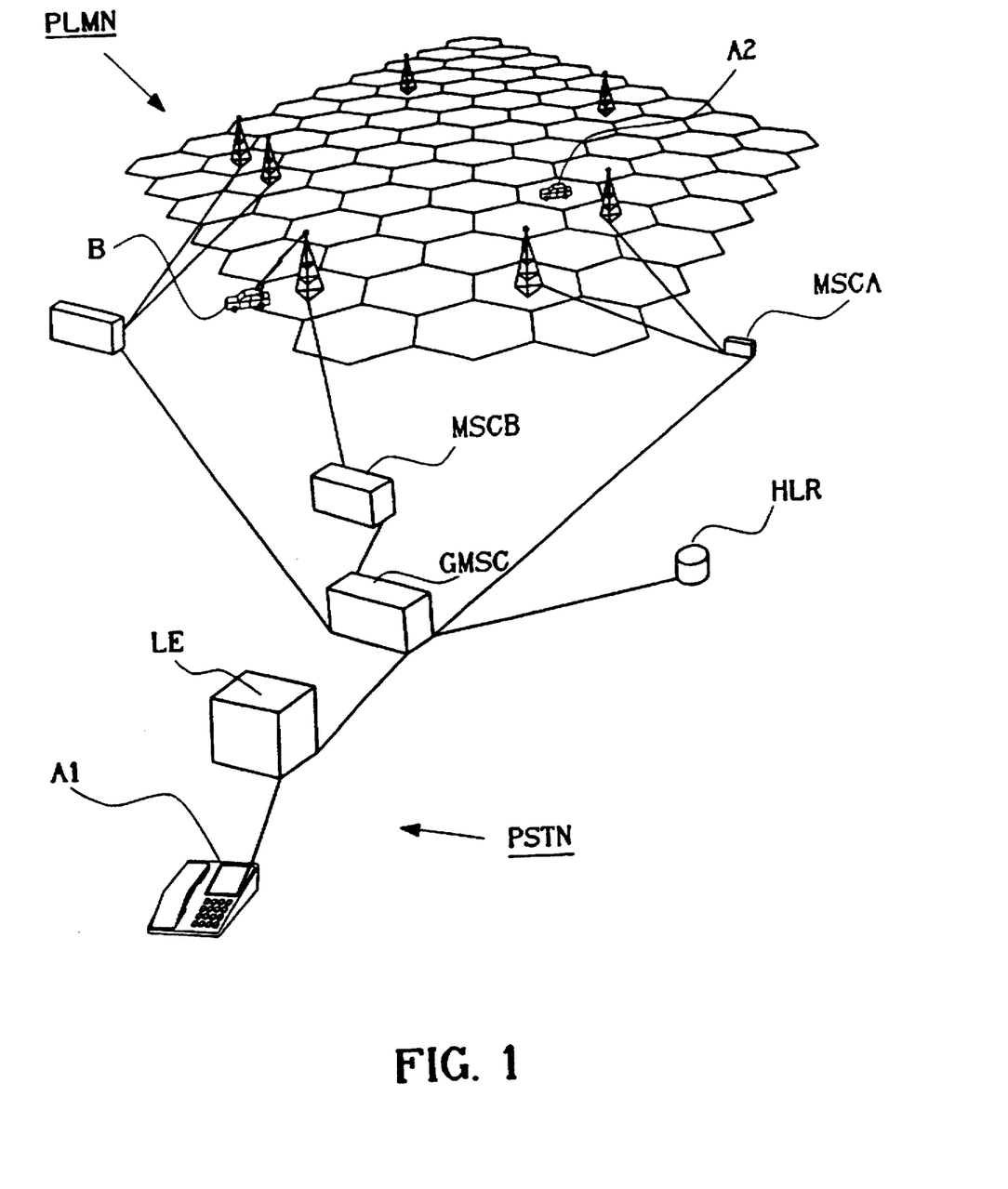
FIG. 1 is a perspective illustration of a telephone system which includes a fixed telephone network and a mobile telephone network.

FIG. 1 illustrates a PDC-type public land mobile network PLMN which includes a central mobile telephone switch, a so-called main switch GMSC, which is connected to a plurality of mobile telephone switches MSCA, MSCB. Each mobile telephone switch MSCA, MSCB is, in turn, connected to a plurality of base stations, each of which superintends a geographical area which includes one or more cells. The mobile telephone network also includes a central data base, a home location register HLR, which is connected to both the main switch GMSC and to all mobile telephone switches MSCA, MSCB within the mobile telephone network. Only the connection between the main switch GMSC and the home location register HLR is shown in FIG. 1. The mobile units A2, B which have obtained a subscription to the network operator of the mobile telephone network are registered in the home location register HLR. The public switched telephone network PSTN includes a local exchange LE to which a telephone unit A1 is connected. A connection between the public switched telephone network PSTN and the public land mobile network PLMN is set up through the main switch GMSC. The main switch GMSC and the mobile telephone switches MSCA, MSCB include the same functions. The switch to which a connection is established from the public switched telephone network PSTN is designated the main switch GMSC. The choice of switch is based on the choice of the most suitable set-up route between the public switched telephone network PSTN and the public land mobile network PLMN. The PDC network is well specified in the standard Internode Specification for Digital Mobile Communications Network—Ver. 4.0.

Figure 2:
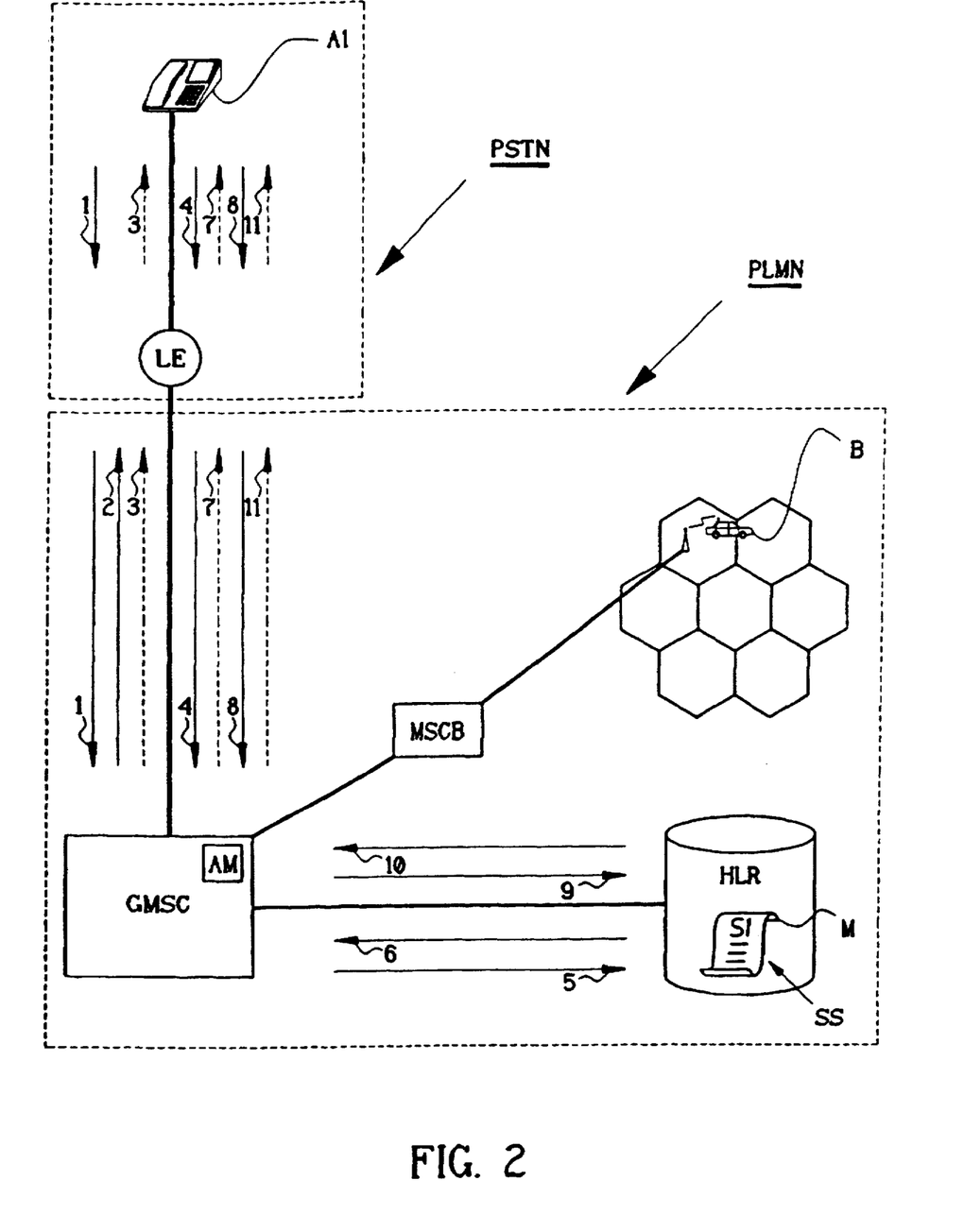
FIG. 2 is a schematic illustration of a telephone communications system which includes a public switched land telephone network and a mobile telephone network.

FIG. 2 illustrates solely those units in a public land mobile network PLMN and a public switched telephone network PSTN that are necessary to obtain an understanding of the invention. Numerous units that are included in a complete telecommunications system have been excluded from the Figure, in an attempt to make the Figure more clear.

The public land mobile network PLMN shown in FIG. 2 includes a main switch GMSC. The main switch GMSC includes a speech machine AM with which speech messages can be sent to users of the telecommunications system. According to one embodiment, the main switch GMSC forms a connecting link between the public land mobile network PLMN and the public switched telephone network PSTN when signalling between the networks. The public switched telephone network PSTN includes a local exchange LE which transfers signalling to and from a telephone unit A1 in the PSTN network. The local exchange LE is connected to the main switch GMSC. The public land mobile network PLMN includes a mobile switching centre MSCB which is connected to the main switch GMSC. The mobile switching centre MSCB transfers signalling to and from a mobile unit B which is located within the cell area and handled by the mobile switching centre MSCB. The mobile telephone network also includes a home location register which is connected to the main switch GMSC. The home location register HLR includes a memory space M in which those supplementary services SS belonging to the mobile unit B are stored. The supplementary services expand the flexibility of the mobile unit B and may be of the following kind, for instance:

Call transfer, i.e. a user is able to transfer incoming calls to another telephone unit.

Restricted use?, i.e. a user is able to prevent unauthorized use of the mobile unit.

Call blocking, i.e. a user is able to block the mobile unit for certain outgoing calls.

All fixed connections between the signalling nodes enumerated above, i.e. between subscribers, switching centres and registers have been shown in FIG. 2 in thick full lines. Signalling, which will be described in detail below, naturally occurs over the fixed connections, although signalling has been shown on one side of these connections in order to show signalling more clearly. Signalling is shown in thin full lines. Signalling that is comprised of so-called prompt messages is shown in thin broken lines. The term prompt message will be explained further on. Signalling directions are arrowed in conjunction with the signalling lines. The signalling illustrated in the Figure and necessary to the present invention does not claim to be the complete signalling that is carried out when handling a supplementary service. Signalling considered to belong to well-known techniques is not mentioned in the text or shown in the Figure. As before mentioned, the public land mobile network PLMN functions according to PDC specifications, although the method which will now be described may also be applied in systems of similar types, for instance in GSM, ADC, and so on. The embodiment described in more detail below illustrates the method of procedure for stating the configuration of a supplementary service S1 intended for the mobile unit B in detail. The service is designated call transfer S1. The inventive method, which will now be presented, is able to perform this important function and comprises the following steps:

A connection 1 is set-up between the telephone unit A1 and the main switch GMSC, when a user of the telephone unit A1 states a service number intended for handling supplementary services, with the aid of the telephone buttons. In this embodiment, the service number is 123456.

A confirmation 2 is sent from the main switch GMSC to the local exchange LE. This confirmation states that the connection 1 has been established.

A first so-called prompt message 3, which in the case of this embodiment is a spoken message, is sent from the speech machine AM in the main switch GMSC to the telephone unit A1. The prompt message 3 has the following wording: "Please state the telephone number of the subscriber to which the supplementary service belongs—followed by the stars—thereafter your personal identification code—finish with a square".

A first tone message 4 is sent from the telephone unit A1 to the main switch GMSC. The telephone unit transmits with so-called DTMF signalling, i.e. a signalling procedure in which in response to the depression of a button or key, there is sent via the connection 1 a tone which has a frequency specific for each button or key. The tone message 4 includes a series of button depressions, which together form an answer to the request made by the spoken message. In the case of the present embodiment, the tone message is comprised of the following button depressions: 0102054593*1341#. The aforementioned prompt messages 3 and tone messages 4 are merely examples of such messages. It is also feasible in accordance with the invention to divide the messages into submessages, so that a first subprompt message will have the following wording: "Please state the telephone number of the subscriber to which the supplementary service belongs—finish with a square". There then follows a first subtone message: 0102054593#. The first subtone message is followed by a second subprompt message: "Please state your personal identification number—finish with a square". There then follows a second subtone message: 1341#. Other variations of the aforesaid dialogue are conceivable to achieve the same result.

The first tone message 4 arriving at the main switch is converted in the switch to a message form suitable for signalling between the main switch GMSC and the home location register HLR.

A check message 5 is sent from the main switch GMSC to the home location register HLR. The check message includes the telephone number of the mobile unit B and the personal identification code, the so-called authority word. The check message 5 will be described in more detail below.

The authority word is checked by comparing the word with an authority word known to the home location register (HLR) and connected with the telephone number of the mobile unit.

The check carried out in the home location register HLR results in acceptance of the authority word received from the telephone unit A1.

An accept message 6 is then sent from the home location register HLR to the main switch GMSC. The accept message informs the main switch GMSC that the user of the telephone unit is authorized. The accept message 6 will be described in more detail below.

The accept message 6 arriving at the main switch GMSC is analyzed in the main switch and converted in the speech machine AM to a message form suitable for prompt-signalling.

A second prompt message 7 is sent to the telephone unit A1 from the speech machine AM in the main switch GMSC. The spoken prompt message 7 has the following wording: "Please state the procedure desired—finish with a square".

A second tone message 8 is sent from the telephone unit A1 to the main switch GMSC. In the present case, the content of the tone message is *21*08836889#. The prefix *21* denotes in this case activation of the call transfer service S1. The prefix is followed by a telephone number 08836889 which identifies the telephone unit to which calls are to be transferred. The prefix given in the second tone message is the same as the prefix that is given when handling supplementary services conventionally, i.e. when a telephone unit to which the services belong is used in the handling procedure. The second prompt message 7 and the second tone message 8 may be divided into submessages in a similar manner to that earlier described for the first prompt message 3 and the first tone message 4.

The second tone message 8 arriving at the main switch GMSC is converted in the main switch to a message form suitable for signalling between the main switch GMSC and the home location register HLR.

A procedure message 9 is sent from the main switch GMSC to the home location register HLR. The procedure message 9 includes specification of the call transfer service S1 in accordance with the second tone message 8.

The call transfer service S1 is handled in accordance with the specification.

A status message 10 is sent from the home location register HLR to the main switch GMSC. The status message informs the main switch GMSC that handling of the call transfer service has been implemented.

The status message 10 arriving at the main switch GMSC is analyzed in the main switch and is converted in the speech machine AM to a message form suitable for prompt signalling.

A third prompt message 11 is sent to the telephone unit A1 from the speech machine AM in the main switch GMSC. The spoken message has the following wording: "The procedure has been implemented—please replace your receiver".

Figure 3:
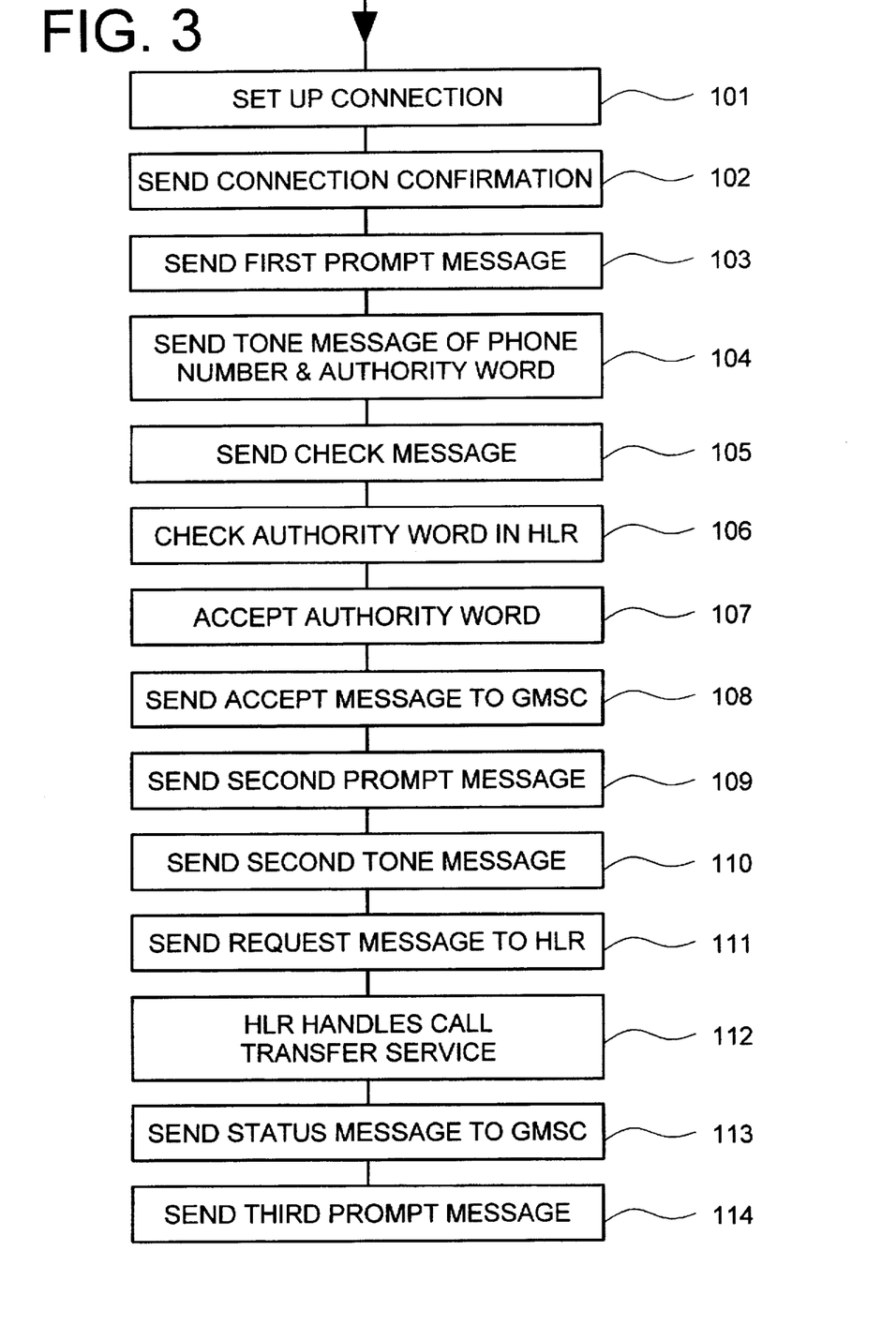
FIG. 3 is a flowsheet which illustrates a signalling procedure for remotely controlling a supplementary service in the configuration according to FIG. 2.

FIG. 3 is a flowsheet illustrating the aforedescribed method. The flowsheet illustrates the steps that are most essential to the concept behind the invention. The abbreviations in the text on the Figure have been explained in the aforegoing. The text on the Figure enclosed in parenthesis refers either to the messages that are sent between different units in the telecommunications system or to a unit in the telecommunications system in which a procedure is carried out. The method is carried out in accordance with FIG. 3 and in accordance with the following description:

The connection 1 is set-up between the telephone unit A1 and the main switch GMSC, in accordance with block 101.

Confirmation 2 of the connection is sent from the main switch GMSC to the local exchange L, in accordance with block 102.

The first prompt message 3 is sent from the main switch GMSC to the telephone unit A1, in accordance with block 103. This prepares the user of the telephone unit A1 to state the telephone number of a mobile unit B and a personal identification code, the so-called authority word.

The telephone number of the mobile B and the authority word are sent from the telephone unit A1 to the main switch GMSC through the medium of the tone message 4, in accordance with block 104.

The telephone number of the mobile B and the authority word are forwarded by sending the check message 5 from the main switch GMSC to the home location register HLR, in accordance with block 105.

The authority word is checked in the home location register HLR, in accordance with block 106.

Subsequent to this check, the authority word is accepted in accordance with block 107.

The main switch GMSC is informed that the user is authorized, by sending the accept message 6 between the home location register HLR and the main switch GMSC, in accordance with block 108.

The second prompt message 7 is sent from the main switch GMSC to the telephone unit A1, in accordance with block 109. The user is herewith requested to state the desired handling of the service S1.

The request for handling of the call transfer service S1 is sent from the telephone unit A1 to the main switch GMSC through the medium of the second tone message 8, in accordance with block 110.

The handling request is forwarded by sending the request message 9 from the main switch GMSC to the home location register HLR, in accordance with block 111.

The call transfer service S1 is handled in the home location register HLR, in accordance with block 112.

The main switch GMSC is informed that handling of the service has been implemented, by sending a status message 10 from the home location register HLR to the main switch GMSC, in accordance with block 113.

The third prompt message 11 is sent from the main switch GMSC to the telephone unit A1, in accordance with block 114. The user is herewith informed that the service has been implemented.

The aforesaid check message 5 and the accept message 6 will now be described briefly in more detail. The structure of the messages 5 and 6 is similar to the structure used in a GSM mobile telephone network, namely "GSM 09.02 MAP". The structure is described in GSM recommendation 09.02. The structure of the messages is created by using a CCITT No. 7 based structure MAP, SCCP and TCAP from CCITT No. 7's protocol stack. CCITT No. 7 is considered to be well-known by the person skilled in this art.

The check message 5 and the accept message 6 can be written according to ASN.1 (CCITT recommendation X.208) as shown below:

| REMOTE SS UPDATE REQUEST (GMSC -> HLR) | |
|---|---|
| RemoteSSUpdateRequest ::= | Operation |
| PARAMETER | SEQUENCE( |
| mSN | MSN, |
| password | ) |
| RESULT | |
| ERRORS | (KnownSubscriber, Passwordfailure) |

The earlier described procedure message 9 and the status message 10 have a structure similar to that used in a GSM mobile telephone network.

The procedure message 9 and the status message 10 can be described according to ASN.1 (CCITT recommendation X.208). An example of this structure when concerning a call transfer service is given below:

| SS-REMOTE-CONTROL (GMSC ->HLR) | |
|---|---|
| SS-Remote-Control ::= | Operation |
| PARAMETER | |
| ss-RemoteData | SS-RemoteData |
| RESULT | SEQUENCE ( |
| ss-Code | SS-Code, |
| status | , |
| forwardedToNumber | ) |

Figure 4:
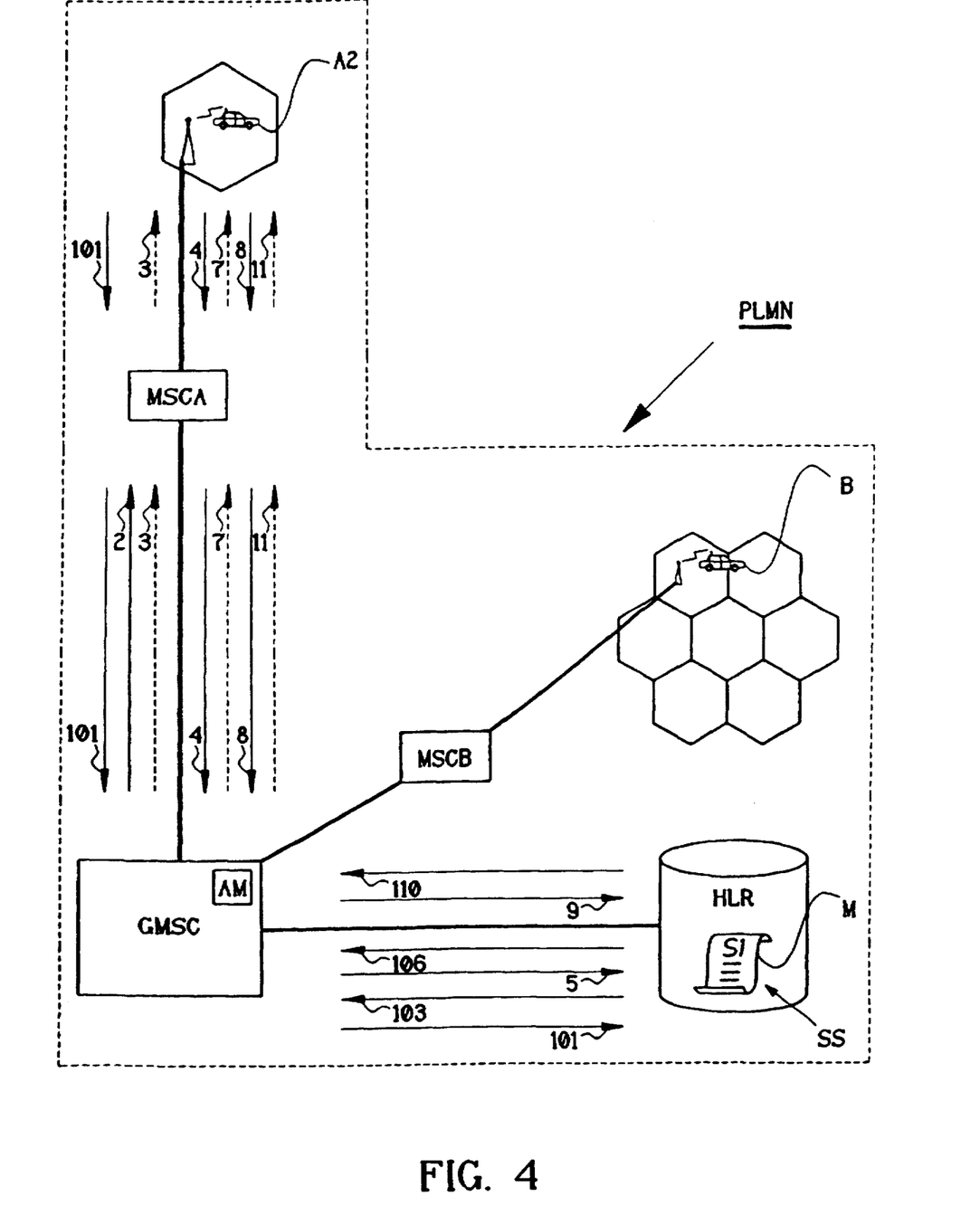
FIG. 4 is a schematic illustration of a telecommunications system which includes a mobile telephone network.

The aforedescribed structure of the messages 5, 6, 9 and 10 that are sent between the main switch GMSC and the home location register HLR are merely examples of a structure for these messages. According to the aforedescribed embodiment, the accept message 6 informs the main switch GMSC that the user of the telephone unit is authorized. The main switch GMSC then analyzes the content of the accept message 6 and chooses an appropriate prompt message with the aid of the analysis result, this prompt message being the second prompt message 7 in the case of the illustrated embodiment. As illustrated in FIG. 4, it is conceivable to analyze instead the content of the accept message in the home location register HLR, and that an accept message 106 instead informs the main switch GMSC that the second prompt message 7 shall be sent to a telephone unit A2, which in the FIG. 4 embodiment is a mobile unit.

According to the embodiment illustrated in FIG. 2, the status message 10 informs the main switch GMSC that handling of the call transfer service S1 has been implemented. The main switch then analyzes the content of the status message 10 and chooses an appropriate prompt message on the basis of the result of the analysis, this prompt message being the third prompt message 11 in the illustrated embodiment. As previously mentioned, it is alternatively possible to make the analysis in the home location register HLR instead, and that a status message 110 will instead inform the main switch GMSC that the third prompt message 11 shall be sent to the telephone unit A2. According to the last described alternative signalling shown in FIG. 4, the main switch (GMSC) has a more transparent character than the main switch earlier described with reference to the FIG. 2 embodiment, in which the main switch GMSC is able to analyze the messages itself and reach its own decisions. One requirement, however, is that the connection 1 set-up in the earlier described FIG. 2 embodiment between the telephone unit A1 and the main switch GMSC according to FIG. 4 is replaced by a connection 101 between the telephone unit A2 and the home location register HLR, whereafter the home location register HLR informs the main switch GMSC that a first prompt message 3 shall be sent to the telephone unit A2, with the aid of a reception request 103. As in the earlier case, the conformation 2 mentioned with reference to FIG. 2 is sent from the main switch GMSC after the connection 1 has been set-up. Since the telephone unit is a mobile unit A2 in this case, the earlier mentioned local exchange LE has been replaced with a mobile services switching centre MSCA.

Figure 5:
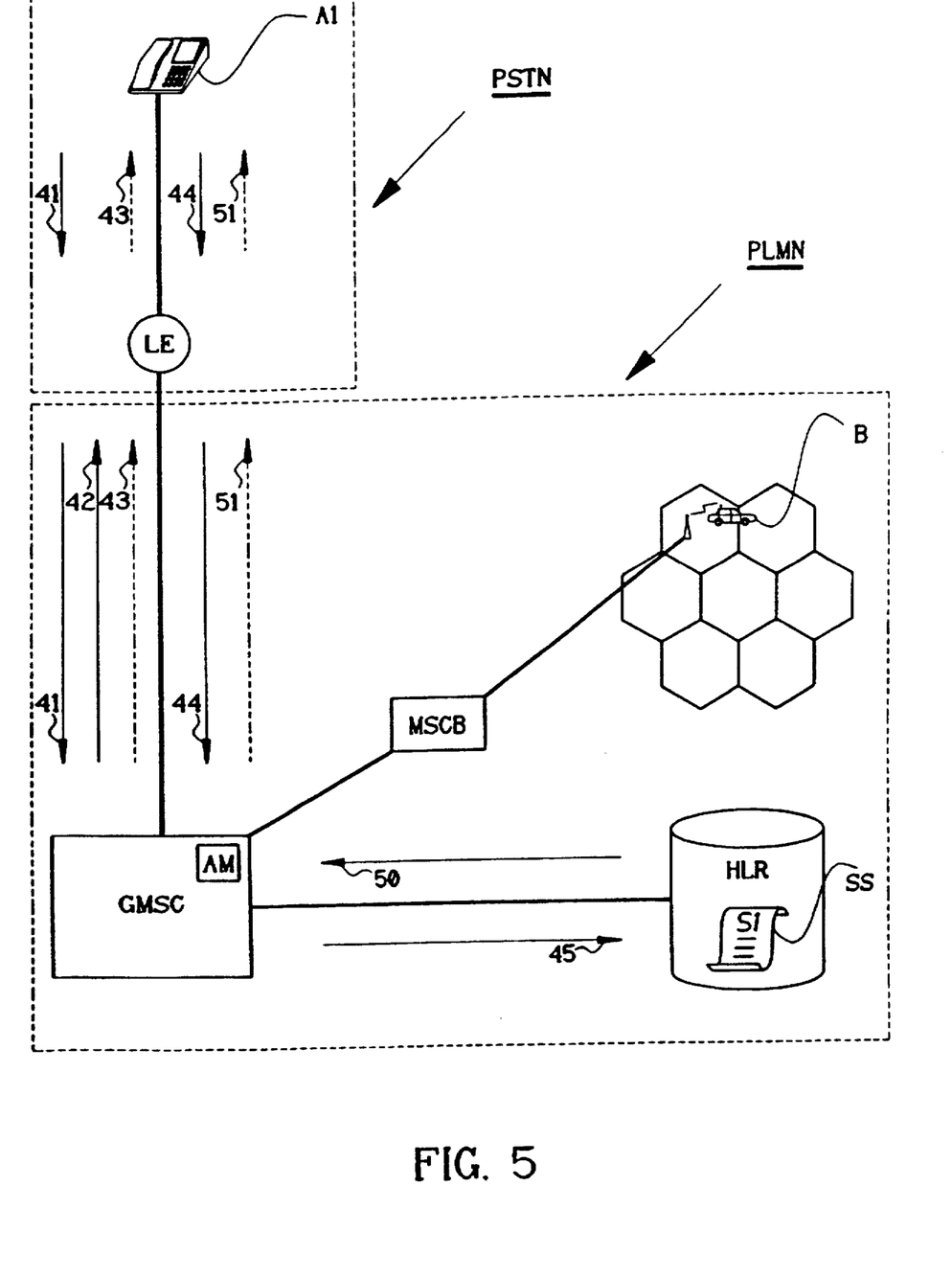
FIG. 5 is a schematic illustration of a telecommunications system which includes a public switched land telephone network and a mobile telephone network.

The aforedescribed signalling procedures for remotely controlling the call transfer service S1 shall be seen only as examples of such procedures. Described below is a further exemplifying embodiment based on the same inventive concept as earlier but involving an alternative signalling procedure. The configuration of the telecommunications system is the same as that earlier described with reference to FIG. 2. In this embodiment, a user has chosen to inspect the content of the call transfer service S1 instead of handling said content. The following procedure, however, is also suitable for handling the service, as earlier shown. The procedure, or method, is described below with reference to FIG. 5:

A connection 41 is set-up between the telephone unit A1 and the main switch GMSC, where a user of the telephone unit A1 states a service number intended for supplementary service inspection, through the buttons on the telephone. In the case of this embodiment, the service number is 654321.

A confirmation 42 is sent from the main switch GMSC to the local exchange LE. The confirmation states that the connection 41 has been set-up.

A first so-called prompt message 43, which is a spoken message, is sent to the telephone unit A1 from the speech machine AM in the main switch GMSC. The prompt message 43 has the following wording: "Please state the telephone number of the subscriber to which the supplementary service belongs—followed by a star—then state your personal identification code—followed by a star—then state the prefix of the service that you wish to inspect—finish with a square".

A first tone message 44 is sent from the telephone unit A1 to the main switch GMSC. In the case of this embodiment, the tone message is generated by depressing the following buttons or keys: 0102054593*1341*21#.

The first tone message 44 arriving at the main switch is converted in the main switch to a message form suitable for signalling between the main switch GMSC and the home location register HLR.

A check message 45 is sent from the main switch GMSC to the home location register HLR. The check message includes the telephone number of the mobile unit B, the authority word and the prefix of the service to be inspected.

The authority word is checked by comparing the word with an authority word known by the home location register (HLR), this word being connected with the telephone number of the mobile unit.

The check carried out in the home location register HLR results in the acceptance of the authority word received from the telephone unit A1.

A status message 50 is sent from the home location register HLR to the main switch GMSC. The status message informs the main switch GMSC of the content of the call transfer service S1.

The status message 50 arriving at the main switch GMSC is analyzed in the main switch and converted to a message form suitable for prompt signalling.

A second prompt message 51 is sent to the telephone unit A1 from the speech machine AM in the main switch GMSC. The spoken message has the following wording: "The call transfer service is activated—The call transfer is ordered to subscriber number 08836889".

Figure 6:
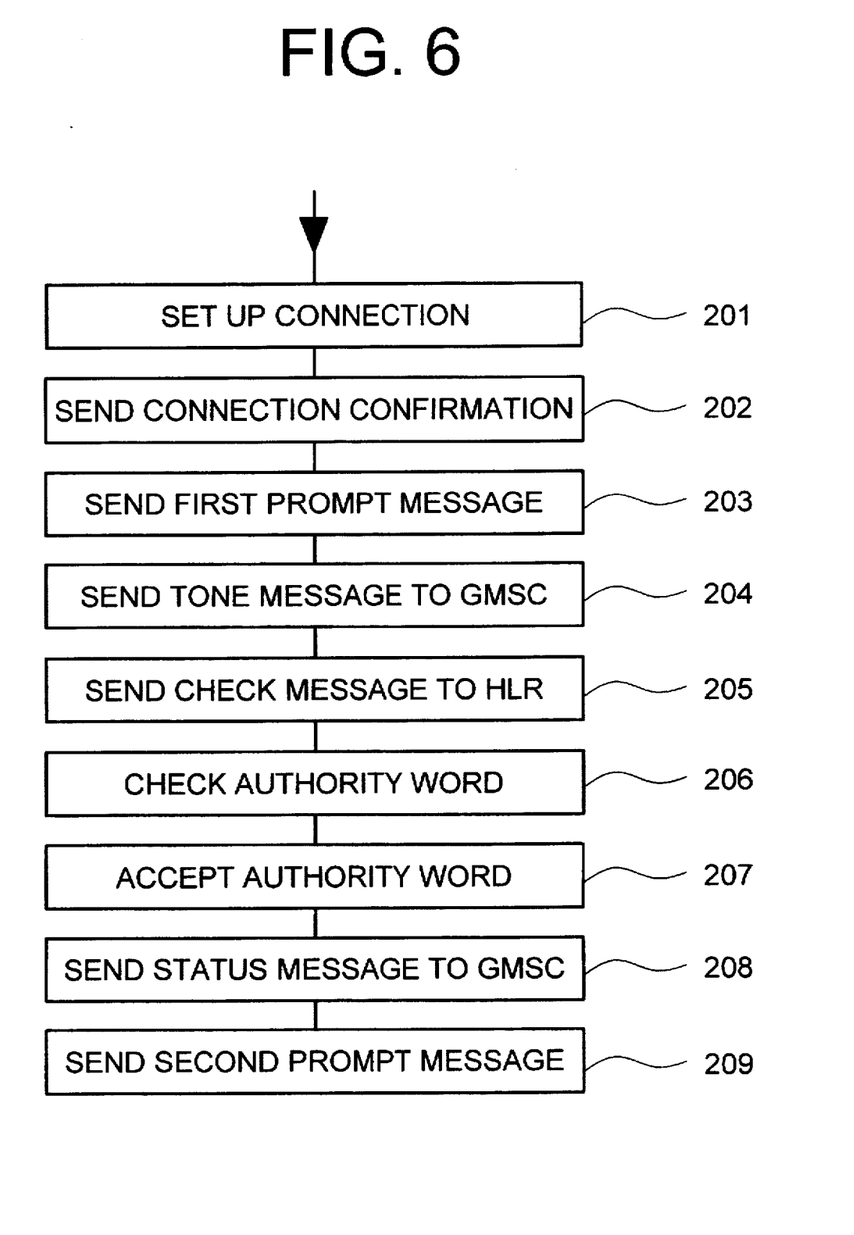
FIG. 6 is a flowsheet which illustrates a signalling procedure for remote control of a supplementary service in the configuration according to FIG. 5.

FIG. 6 is a flowsheet describing the aforesaid method. The flowsheet illustrates the most essential steps in the concept behind the invention. The abbreviations in the text in the Figure have been explained above. The text presented in parenthesis in the Figure refers either to the messages that are sent between different units in the telecommunications system or to a unit in the telecommunications system in which a procedure is carried out. The method is carried out in accordance with FIG. 3 and in accordance with the following description:

The connection 41 is set-up between the telephone unit A1 and the main switch GMSC, in accordance with block 201.

Conformation 42 of the connection set-up is sent from the main switch GMSC to the local exchange LE, in accordance with block 202.

The first prompt message 43 is sent from the main switch GMSC to the telephone unit A1, in accordance with block 203. The user of the telephone unit A1 is herewith requested to state the telephone number of a mobile unit B, an authority word and the service to be inspected.

The telephone number of the mobile B, the authority word and the inspection request are sent from the telephone unit A1 to the main switch GMSC through the medium of the tone message 44, in accordance with block 204.

The telephone number of the mobile B, the authority word and the inspection request are forwarded by sending a check message 45 from the main switch GMSC to the home location register HLR, in accordance with block 205.

The authority word is checked in the home register HLR, in accordance with block 206.

Subsequent to this check, the authority word is accepted in accordance with block 207.

The main switch GMSC is informed of the content of the service, by sending the status message 50 from the home register HLR to the main switch GMSC, in accordance with block 208.

The second prompt message 51 is sent from the main switch GMSC to the telephone unit A1, in accordance with block 209. The user is herewith informed of the content of the service.

It has been assumed in the aforedescribed embodiments that the user has always given the correct authority word, the correct telephone number to the mobile unit B and has pressed the buttons correctly in the message sequence. When this is not the case, the user is permitted to make a number of further attempts, whereafter the procedure is broken-off. The procedure relating to error handling is considered to be a well-known technique and need not therefore be described in detail here. When the wrong number of buttons are pressed, this can be detected in the main switch, for instance, which then sends a prompt message with the words "try again". When a wrong authority word or a wrong mobile unit telephone number is given, this is detected in the home location register HLR which then sends a conventional error message to the main switch GMSC. The main switch herewith sends a prompt message with the words: "try again". After the third attempt, for instance, the main switch sends a prompt message with the words: "The procedure has been discontinued", whereafter the connection is released.

Figure 7:
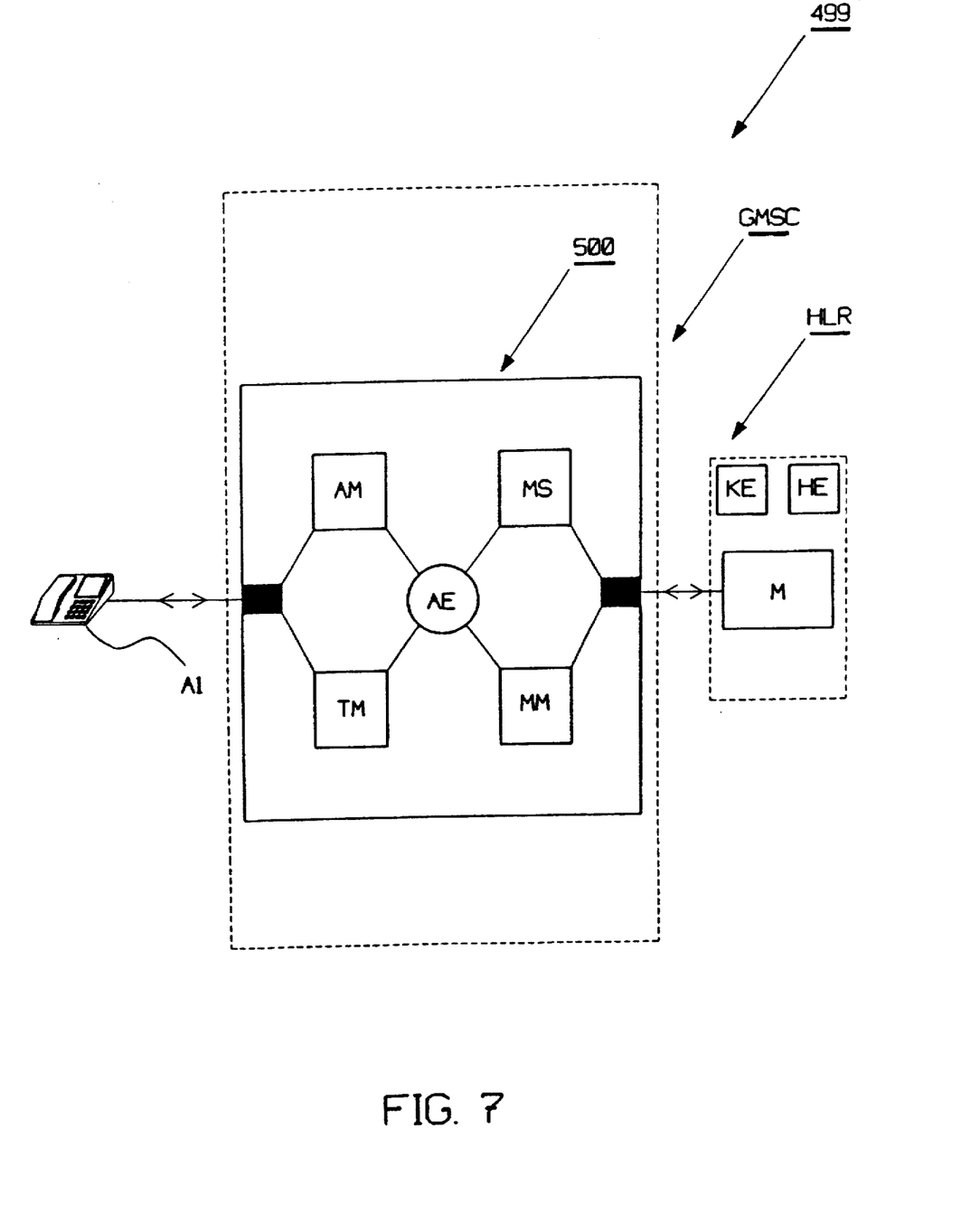
FIG. 7 is a block schematic illustrating a signal distribution arrangement.

FIG. 7 illustrates an inventive so-called handling arrangement 499. The handling arrangement 499 is used to execute the procedures earlier described with reference to the embodiments, i.e. handling or inspecting supplementary services SS from any chosen telephone unit. The arrangement includes a main switch GMSC which incorporates a conversion unit 500 which is connected to the telephone unit A1 and a home location register HLR. The conversion unit 500 is used to convert and distribute signals to and from the telephone unit A1 and the home location register HLR, and includes a speech machine AM for transmitting spoken messages to the telephone unit A1. The conversion unit 500 also includes a tone receiver TM which receives the tone messages from the telephone unit A1. The arrangement 499 also includes a map transmitter MS and a map receiver MM by means of which messages can be sent from the main switch GMSC to the home location register HLR, and vice versa, through the medium of a so-called MPA interface. The conversion unit 500 also includes a so-called analysis unit AE in which signals from one of the different units AM, TM, MS and MM are analyzed and converted for transmission to another of the various unit AM, TM, MS and MM. The messages sent by the conversion unit 500 are the same as those described in the earlier embodiments with reference to FIGS. 2, 4 and 5, among others. The handling arrangement 499 also includes a check unit KE in the home location register HLR and a handling unit HE.

The most essential components of the arrangement 499 for performing the method steps earlier described with reference to FIG. 2 will now be explained. When the authority word and the mobile unit subscriber number belonging to the authority word have arrived at the check unit KE via the conversion unit 500, the word is compared with an authority word stored in the check unit KE in a memory site intended for the mobile unit B. After having ascertained the authority of a user of the telephone unit A1, notice of the authority is sent via the conversion unit 500 to the telephone unit A1, as earlier described in the embodiment. The conversion unit 500 then sends a supplementary service handling request from the telephone unit A1 to the handling unit HE. The handling unit HE changes the parameters that have been specified in the aforesaid request for handling of the supplementary service S1 in a memory unit M. Notice that the handling has been carried out and is then sent by the conversion unit 500 to the telephone unit A1.

The various examples of methods and arrangements described above are not restricted to any particular configuration of a telecommunications system. As before mentioned, the method is not suitable solely for PDC-type mobile telephone networks. The method may also be applied to other types of networks, for instance GSM or ADC networks, and with mobile telephone networks having a configuration similar to the aforesaid. The invention can also be applied in networks which have satellite-type base stations. Neither is it necessary for the networks to be provided with speech transmission facilities in order for the invention to be applied. The invention can also be applied in data or image transmission systems, for instance. Remote control of a service can be effected not only from a fixedly connected telephone unit or a mobile unit, as in the case of the described embodiment, but also from a data terminal that has access to a telephone network, for instance. When an order is made from a mobile unit, it is not necessary for this unit to be located in or to belong to the same network or even the same type of network as the mobile unit to which the services belong.

As earlier mentioned, the aforedescribed methods may be varied and modified. For instance, instead of spoken messages, the prompt messages may include messages which generate text on a user display. For instance, the tone messages may include light pulses instead of the aforesaid tones of different frequencies. Neither is it necessary for the mobile unit telephone number to be stated by the user in the first tone message. It is also conceivable to state the pin-code or some other type of identification. The authority word can be checked already in the telephone unit used by the user to remote control the service. This can take place, for instance, after the user has stated his/her authority by inserting an authorization card in the telephone unit. In this case, the telephone unit is assumed to be equipped with a card reader and with the necessary equipment for carrying out the authority check.

In other words, the invention is not restricted to the aforedescribed and illustrated exemplifying embodiments since modifications can be made within the scope of the following Claims.

What is claimed is:

1. A method of handling supplementary services for a mobile unit in a telecommunications system, wherein the telecommunications system includes a public land mobile network to which the mobile unit is subscribed and a main switch to which a home location register is connected and in which the mobile unit's supplementary services are stored, the method comprising the steps of:

setting up a non-call related connection for handling the supplementary services between any chosen telephone unit in the telecommunications system and the home location register;

sending an authority word belonging to the mobile unit and an identification of the mobile unit to the home location register from the chosen telephone unit telecommunications system via a telephone connection intended for handling supplementary;

checking the sent authority word by comparing the sent authority word with an authority word known to the home location register;

accepting the sent authority word received from the telephone unit, if authorized;

sending a specification for handling a supplementary service from the telephone unit to the home location register; and performing the specified handling of the supplementary service.

2. The method of claim 1, further comprising the step of sending an authority message from the home location register to the telephone unit, wherein the authority message indicates that the authority word has been accepted.

3. The method of claim 2, wherein the step of sending the authority message includes the steps of:

sending, from the home location register to the main switch, an accept message which indicates that a user of the telephone unit has authority; and sending, from the main switch to the telephone unit, a second prompt message which indicates that the main switch is prepared to receive a specification for handling a supplementary service.

4. The method of claim 2, wherein the step of sending the authority message comprises the steps of:

sending, from the home location register to the main switch, an acceptance message which commands the main switch to send a second prompt message to the telephone unit; and sending, from the main switch to the telephone unit, a second prompt message which indicates that the main switch is prepared to receive a specification for handling the supplementary service.

5. The method of claim 4, wherein the step of sending the specification for handling the supplementary service comprises the steps of:

sending, from the telephone unit to the main switch, a second tone message which includes the providing of the supplementary service requested; and sending, from the main switch to the home location register, a procedure message which includes the specification for providing the supplementary service.

6. The method of claim 4, further comprising the steps of:

sending, from the home location register to the main switch, a status message which commands the main switch to send a third prompt message to the telephone unit; and sending the third prompt message from the main switch to the telephone unit, whereby a user of the telephone unit is informed that handling the supplementary service has been implemented.

7. The method of claim 1, further comprising the steps of:

setting up a connection between the telephone unit and the main switch; and sending, from the main switch to the telephone unit, a first prompt message which indicates that the main switch is prepared to receive the authority word and the identification of the mobile unit.

8. The method of claim 7, wherein the telecommunications system includes a public switched telephone network having a local exchange to which the telephone unit is connected, and in which the step of sending the first prompt message comprises the step of sending, from the main switch to the local exchange, a confirmation indicating that the connection has been established.

9. The method of claim 7, wherein the public land mobile network includes a mobile services switching center to which the telephone unit is connected, and the step of sending the first prompt message comprises the step of sending, from the main switch to the mobile services switching center, a confirmation indicating that the connection has been established.

10. The method of claim 1, wherein the step of sending the authority word and the identification of the mobile unit comprises the steps of:

sending, from the telephone unit to the main switch, a first tone message which includes the authority word and the identification of the mobile unit; and sending, from the main switch to the home location register, a check message which includes the authority word and the identification of the mobile unit.

11. The method of claim 1, wherein the step of sending a specification for providing a supplementary service includes the steps of:

sending, from the telephone unit to the main switch, a second tone message which includes the requested handling of the supplementary service; and sending, from the main switch to the home location register, a procedure message which includes the specification for handling the supplementary service.

12. The method of claim 1, further comprising the steps of:

sending, from the home location register to the main switch, a status message which indicates that handling the supplementary service has been implemented; and sending, from the main switch to the telephone unit, a third prompt message which informs a user of the telephone unit that handling of the supplementary service has been implemented.

13. The method of claim 1, further comprising the steps of:

setting up the connection between the telephone unit and the home location register;

sending a reception request ordering the main switch to send a first prompt message to the telephone unit; and sending, from the main switch to the telephone unit, a first prompt message which indicates that the main switch is prepared to receive the authority word and the identification of the mobile unit.

14. The method of claim 13, wherein the telecommunications system includes a public switched telephone network having a local exchange to which the telephone unit is connected, and the step of sending the first prompt message comprises the step of sending, from the main switch to the local exchange, a confirmation which confirms that the connection has been established.

15. The method of claim 13, wherein the public land mobile network includes a mobile services switching center to which the telephone unit is connected, and the step of sending the first prompt message comprises the step of sending, from the main switch to the mobile services switching center, a confirmation confirming that the connection has been established.

16. The method of claim 13, wherein the step of sending the authority word and the identification of the mobile unit includes the steps of:

sending, from the telephone unit to the main switch, a first tone message which includes the authority word and the identification of the mobile unit; and sending, from the main switch to the home location register, a check message which includes the authority word and the identification of the mobile unit.

* * * * *